(12) United States Patent
Moriya et al.

(10) Patent No.: US 11,203,270 B2
(45) Date of Patent: Dec. 21, 2021

(54) ELECTRIC VEHICLE AND CHARGE CONTROL APPARATUS FOR ELECTRIC VEHICLE

(71) Applicant: SUBARU CORPORATION, Tokyo (JP)

(72) Inventors: Fumiyuki Moriya, Tokyo (JP); Yuta Totsuka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 91 days.

(21) Appl. No.: 16/837,394

(22) Filed: Apr. 1, 2020

(65) Prior Publication Data

US 2021/0009000 A1 Jan. 14, 2021

(30) Foreign Application Priority Data

Jul. 10, 2019 (JP) .............................. JP2019-128049

(51) Int. Cl.
| | |
|---|---|
| *H02J 7/00* | (2006.01) |
| *B60L 53/66* | (2019.01) |
| *B60L 50/64* | (2019.01) |
| *B60L 53/124* | (2019.01) |
| *H02J 50/60* | (2016.01) |

(Continued)

(52) U.S. Cl.
CPC .............. *B60L 53/66* (2019.02); *B60L 50/64* (2019.02); *B60L 53/124* (2019.02); *H02J 50/60* (2016.02); *B60L 53/12* (2019.02); *B60L 53/122* (2019.02); *B60W 2556/10* (2020.02); *B60W 2556/45* (2020.02); *H02J 50/12* (2016.02); *Y02T 90/12* (2013.01)

(58) Field of Classification Search
CPC ........ B60L 53/66; B60L 50/64; B60L 53/124; B60L 53/12; B60L 53/122; H02J 50/60; H02J 50/12; B60W 2556/10; B60W 2556/45; Y02T 90/12
USPC .......................................... 320/108; 307/104
See application file for complete search history.

(56) References Cited

U.S. PATENT DOCUMENTS

2013/0293026 A1* 11/2013 Miyamoto ............... G01V 3/10
307/104
2016/0241064 A1* 8/2016 Hatakeyama ........... H02J 50/60
(Continued)

FOREIGN PATENT DOCUMENTS

JP 2017-127064 A 7/2017

*Primary Examiner* — Zixuan Zhou
(74) *Attorney, Agent, or Firm* — McGinn IP Law Group, PLLC (57) ABSTRACT

An electric vehicle includes a power receiver, a controller, an error detector, and a record processor. The power receiver wirelessly receives electric power from power transmission equipment disposed outside the vehicle. The controller controls the reception of the electric power via the power receiver. The error detector detects an error in power transmission from the power transmission equipment to the power receiver during the control of the reception of the electric power by the controller. The record processor records error history information regarding the error detected by the error detector and causes a data volume of the error history information retrievable from the record processor to be smaller when the error is due to a foreign object present between the power transmission equipment and the vehicle than when the error is not due to the foreign object.

19 Claims, 6 Drawing Sheets

(51) Int. Cl.
  *B60L 53/12* (2019.01)
  *B60L 53/122* (2019.01)
  *H02J 50/12* (2016.01)

(56) References Cited

U.S. PATENT DOCUMENTS

2017/0373544 A1* 12/2017 Niizuma ................. B60L 53/64
2021/0167637 A1*  6/2021 Schwartz ................ H02J 50/70
2021/0257863 A1*  8/2021 Sato ..................... H04B 5/0081

* cited by examiner

ELECTRIC VEHICLE AND CHARGE CONTROL APPARATUS FOR ELECTRIC VEHICLE

CROSS-REFERENCE TO RELATED APPLICATIONS

The present application claims priority from Japanese Application No. 2019-128049 filed on Jul. 10, 2019, the entire contents of which are hereby incorporated by reference.

BACKGROUND

The disclosure relates to an electric vehicle and a charge control apparatus for an electric vehicle.

There is a technology for wirelessly transmitting electric power from a power transmitter of ground equipment to a power receiver of an electric vehicle, to charge a battery provided in the electric vehicle with the received electric power. Such a charging mode is referred to as "wireless charging". If a foreign object is present near the power transmitter during wireless charging, the foreign object can produce heat. Japanese Unexamined Patent Application Publication No. 2017-127064 discloses a technology for providing a notification about stopping the power transmission from the vehicle to the power transmitter when the presence of a foreign object is detected during wireless charging.

SUMMARY

An aspect of the technology provides an electric vehicle that includes a power receiver, a controller, an error detector, and a record processor. The power receiver is configured to wirelessly receive electric power from power transmission equipment disposed outside the vehicle. The controller is configured to control the reception of the electric power via the power receiver. The error detector is configured to detect an error in power transmission from the power transmission equipment to the power receiver during the control of the reception of the electric power by the controller. The record processor is configured to record error history information regarding the error detected by the error detector, and cause a data volume of the error history information retrievable from the record processor when the error is due to a foreign object present between the power transmission equipment and the vehicle to be different from a data volume of the error history information retrievable from the record processor when the error is not due to the foreign object. The data volume of the error history information retrievable from the record processor when the error is due to the foreign object is smaller than the data volume of the error history information retrievable from the record processor when the error is not due to the foreign object.

An aspect of the technology provides a charge control apparatus for an electric vehicle. The apparatus includes a power receiver and circuitry. The power receiver is configured to wirelessly receive electric power from power transmission equipment disposed outside the vehicle and charge a battery with the received electric power. The circuitry is configured to control the charging of the battery via the power receiver, detect an error in power transmission from the power transmission equipment to the power receiver during the charging of the battery, record error history information regarding the detected error, and cause a data volume of the error history information retrievable when the error is due to a foreign object present between the power transmission equipment and the vehicle to be different from a data volume of the error history information retrievable when the error is not due to the foreign object. The data volume of the error history information retrievable when the error is due to the foreign object is smaller than the data volume of the error history information retrievable when the error is not due to the foreign object.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Embodiments of the disclosure will now be described with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
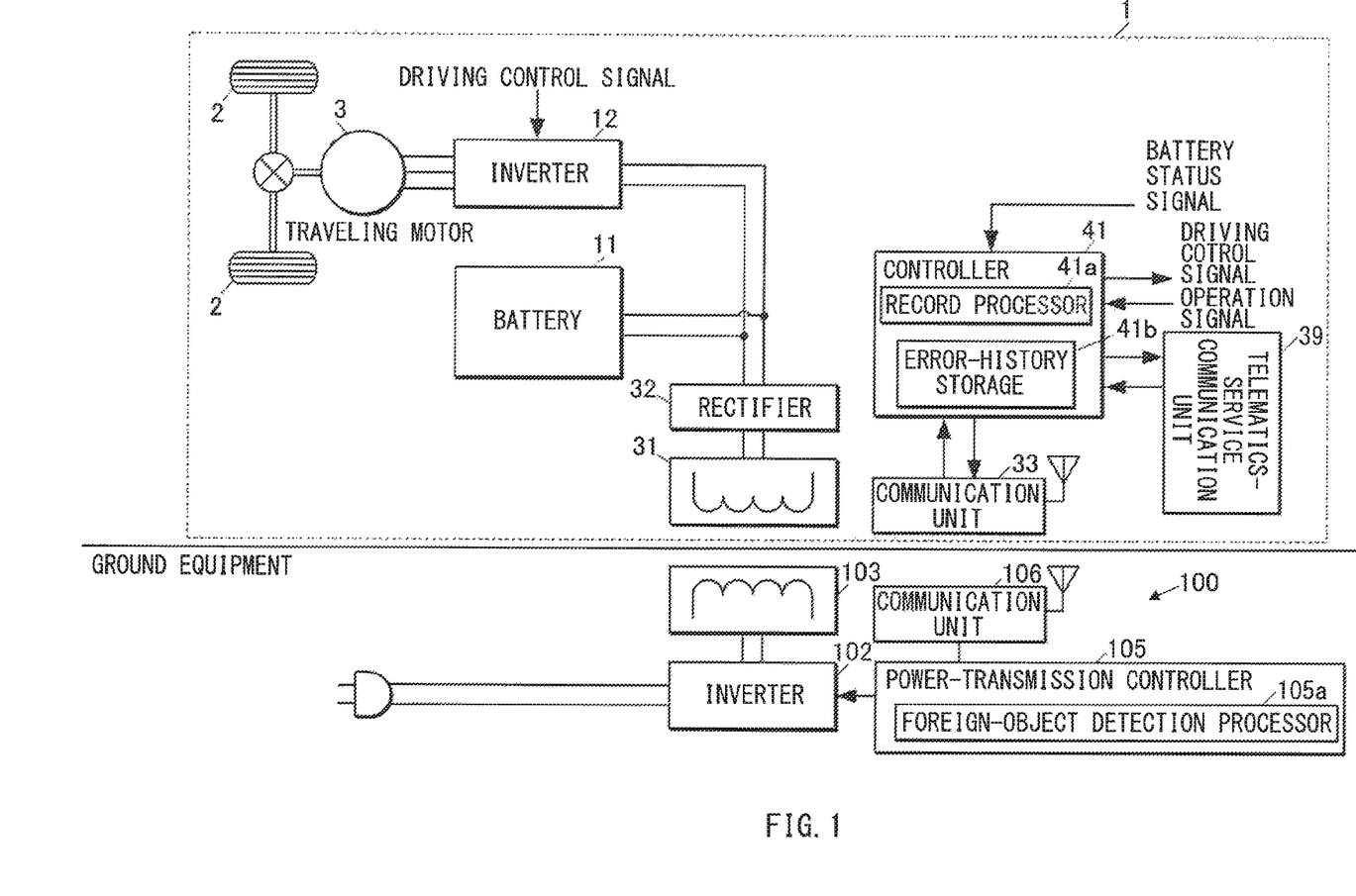
FIG. 1 is a block diagram illustrating an overall configuration of an electric vehicle according to one example embodiment of the disclosure.

FIG. 1 is a block diagram illustrating an overall configuration of an electric vehicle 1 according to an embodiment of the disclosure. The electric vehicle 1 according to this embodiment may be an electric vehicle (EV) or a hybrid electric vehicle (HEV) having a wireless charging function. The electric vehicle 1 may include driving wheels 2, an electric motor 3, a battery 11, an inverter 12, a power receiver 31, and a rectifier 32. The electric motor 3 may generate power to be transmitted to the driving wheels 2. The electric motor 3 is hereinafter referred to as a "traveling motor 3". The battery 11 may store electric power to be fed to the traveling motor 3. The inverter 12 may convert DC power outputted from the battery 11 to AC power and feed the AC power to the traveling motor 3. The power receiver 31 wirelessly receives power by an electromagnetic action from ground equipment 100 disposed outside the vehicle 1. The rectifier 32 may rectify the power received by the power receiver 31 and feed the rectified power to the battery 11 and the inverter 12. The electric vehicle 1 may further include a controller 41, a communication unit 33, and a telematics-service communication unit 39. The controller 41 may execute traveling control, user interface control, wireless charging control, and an any other control. The communication unit 33 may communicate with the ground equipment 100 during the wireless charging. The telematics-service communication unit 39 may communicate with a user's mobile terminal via a telematics service. The user may be, for example, the driver of the electric vehicle 1.

The battery 11 may be, for example, a lithium-ion secondary battery or a nickel-metal hydride secondary battery. In this embodiment, the battery 11 may be rated to output sufficiently high voltage to drive the traveling motor 3. The battery 11 may serve as a main battery or a high-voltage battery. Besides the battery 11, a lower voltage battery may be provided. Such a lower voltage battery may also be referred to as a "sub-battery".

The power receiver 31 may be, for example, a power receiving coil that receives power wirelessly transmitted by electromagnetic induction or magnetic resonance. While the power receiver 31 is aligned with the power transmitter 103 of the ground equipment 100, an AC current may be fed to the power transmitter 103, causing the power receiver 31 to generate an AC electromotive force.

The controller 41 may receive an operation signal indicative of an operation performed by an occupant of the electric vehicle 1. The controller 41 may drive the inverter 12 and any other component in accordance with the operation signal to control the traveling of the electric vehicle 1. The controller 41 may further include a battery managing unit that manages the status information of the battery 11. The battery managing unit may receive a status signal of the battery 11 to manage the charging rate of the battery 11, for example. The status signal may indicate the status of the battery 11 including the discharge current, the charge current, the voltage, the temperature, and the like. The controller 41 may also receive an operation instruction from the occupant via an operation panel and control operations of the components of the electric vehicle 1. The operation panel may include a start button for starting wireless charging. The controller 41 may also control the output of information to the user's mobile terminal via the telematics-service communication unit 39.

The controller 41 may also control the wireless charging while communicating with the ground equipment 100 via the communication unit 33. During the wireless charging, the controller 41 may calculate a charging current to be sent to the battery 11 on the basis of the management information of the battery 11, and request the transmission of electrical power from the ground equipment 100 to acquire the calculated charging current. The management information may include the state of charge (SOC), the temperature, and the input limit power of the battery 11, for example.

The controller 41 may include a record processor 41*a* and an error-history storage 41*b*. When an error occurs somewhere in the electric vehicle 1, the record processor 41*a* may record error history information that will contribute to malfunction diagnosis or information that will be used or referred to during the malfunction diagnosis. The error-history storage 41*b* may store the error history information through processing by the record processor 41*a*. The error-history storage 41*b* may include, for example, a non-volatile recording medium. The record processor 41*a* may be a software function module or a functional module including dedicated hardware. The software function module may be implemented by the central processing unit (CPU) of the controller 41 executing a program.

The controller 41 may include one electronic control unit (ECU) or multiple ECUs communicating and operating in cooperation with each other.

When an error occurs somewhere in the electric vehicle 1, the record processor 41*a* may record diagnostic trouble codes (DTCs) indicating the content of the error, a time stamp, and log data or freeze frame data (FFD) indicating the statuses of the components of the vehicle at the time of the error. The coded content of the error may include, for example, errors in the ECUs, engine stall, wireless charging error, and the like. The time stamp may include, for example, the cumulative number of times the ignition key is turned to the ON position and the time data indicating a time period starting from the turning of the ignition key to the ON position. The log data may include detection values transmitted from various sensors to the ECUs, various parameters calculated by the ECUs, and various items of control data. Such data may include data having no immediate relation to the error.

The error history information recorded in the error-history storage 41*b* may be retrieved by, for example, a diagnostic tool provided separately from the electric vehicle 1. The diagnostic tool may be a computer and may have a specific retrieval function, i.e., a function for retrieving the error history information. The retrieval function may be realized by software or a function program executed by the CPU of the computer executing. The diagnostic tool may be coupled to the controller 41 via a cable. When the retrieval function is executed, the diagnostic tool having the retrieval function may establish communication with the controller 41 to retrieve error history information. The error history information may then be displayed in a form of a list on the display unit of the diagnostic tool. The diagnostic tool may be used by, for example, service workers at the manufacturers and service stations. For example, a service worker may be a person in charge of repair and service. The diagnostic tool may also be used by developers at the manufacturer. The retrieval function may have different modes, such as a normal mode to be used by a service worker and a developer mode to be used by a developer.

The ground equipment 100 may be power transmission equipment that wirelessly transmits electric power to the electric vehicle 1. The ground equipment 100 may include a power transmitter 103, an inverter 102, a communication unit 106, and a power-transmission controller 105. The power transmitter 103 may wirelessly transmit power by an electromagnetic action to the power receiver 31 of the electric vehicle 1. The inverter 102 may receive power from a commercial power source or the like and feed an AC current to the power transmitter 103. The communication unit 106 may communicate with the electric vehicle 1 during the wireless charging. The power-transmission controller 105 may drive the inverter 102 to control the power transmission from the power transmitter 103. In this embodiment, the power transmitter 103 may be a power transmitting coil.

The power-transmission controller 105 may be a computer including a foreign-object detection processor 105a. The foreign-object detection processor 105a may detect a foreign object, such as a stone, residing near the power transmitter 103, e.g., between the power transmitter 103 or the power transmitting coil and the power receiver 31 or the power receiving coil. The foreign-object detection processor 105a may be a software function module implemented by the CPU executing a program, for example. The foreign-object detection processor 105a may receive information regarding the data volume of power reception from the electric vehicle 1 by communication via the communication unit 106 during the power transmission. The foreign-object detection processor 105a then may determine whether a foreign object is present near the power transmitter 103 on the basis of the difference between the data volume of power transmission from the power transmitter 103 and the data volume of power reception by the electric vehicle 1. The presence of a foreign object may be detected on the basis of a decrease in the data volume of power received by the power receiver 31 caused by the the foreign object partly absorbing the wirelessly transmitted power. Note that the ground equipment 100 may detect a foreign object using any foreign-object detector besides that described above. Examples of such a foreign-object detector suitable for this embodiment may include a detector that detects a variation in a magnetic field caused by a foreign object, a detector that detect a foreign object by image recognition performed on an image of the foreign object, and a detector that detects a foreign object using an ultrasonic radar, an optical radar, or the like. Some of these error detectors may be disposed in the electric vehicle 1 instead of in the ground equipment 100. In this way, it is possible to detect a foreign object in the electric vehicle 1 without resorting to a notification from the ground equipment 100.

In one embodiment, the power receiver 31 may serve as a "power receiver". In one embodiment, the controller 41 may serve as a "controller" and an "error detector". That is, the "controller" and the "error detector" may be implemented by a single unit or the controller 41 in this embodiment. In one embodiment, the record processor 41a and the error-history storage 41b may serve as a "record processor". In one embodiment, the communication unit 33 may serve as a "communication unit". In one embodiment, the telematics-service communication unit 39 may serve as an "information output unit". The "controller" and the "error detector" may alternatively be implemented by separate units in place of a single unit. For example, the "controller" may correspond to the controller 41 of the vehicle 1, and the "error detector" may correspond to the power-transmission controller 105 including the foreign-object detection processor 105a of the ground equipment 100.

[Error History Recording of Wireless Charging: for Malfunction]

Figure 2:
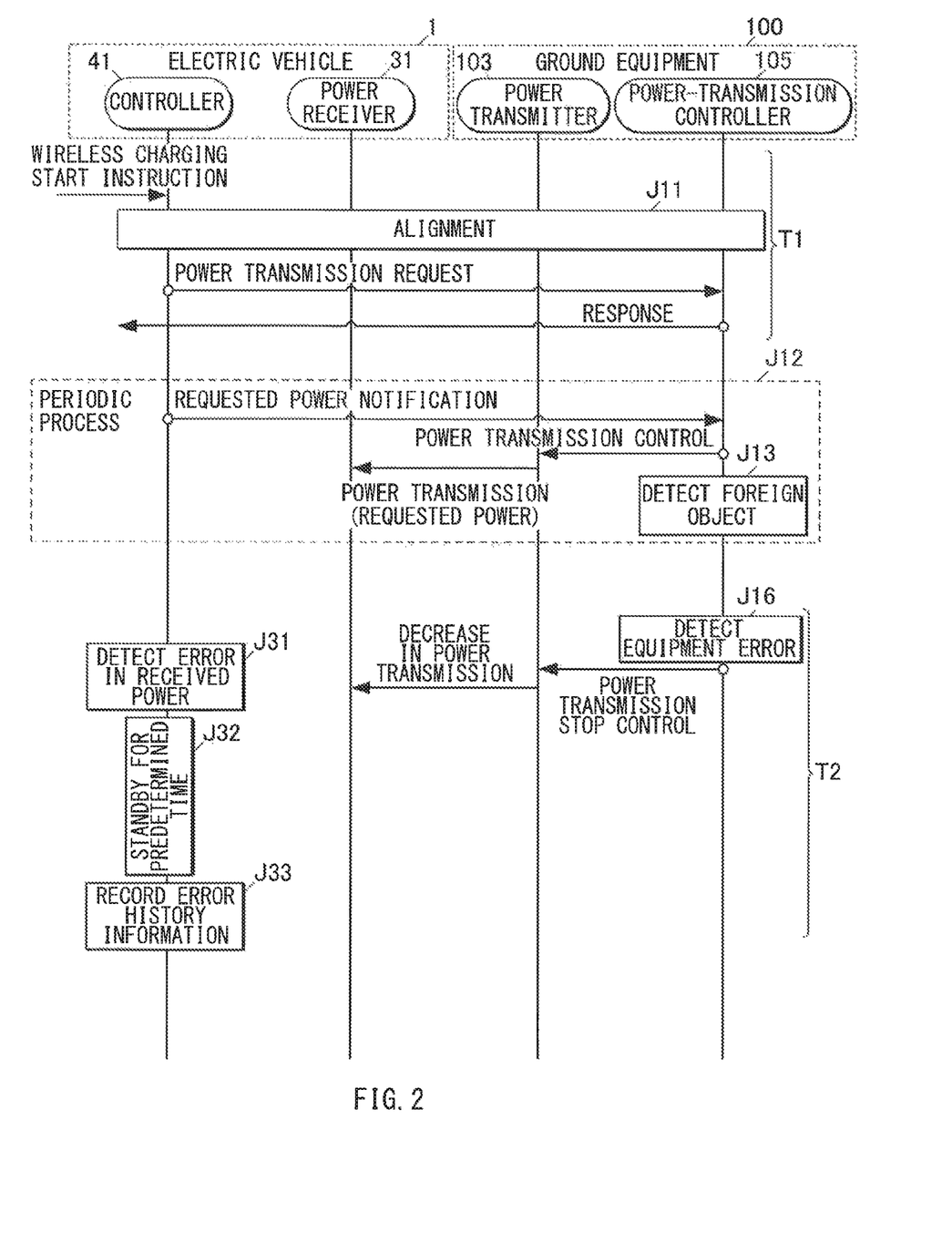
FIG. 2 is a sequence diagram illustrating a process flow for a case in which wireless charging is stopped due to a malfunction.

FIG. 2 is a sequence diagram illustrating a process flow for a case in which wireless charging is stopped due to a malfunction. In response to the controller 41 receiving an instruction for starting wireless charging from a user or driver operating the start button, the controller 41 may start controlling the wireless charging in cooperation with the power-transmission controller 105 of the ground equipment 100. In a start period T1, the controller 41 may execute an alignment process J11 for the electric vehicle 1. In the alignment process J11, the power transmitter 103 may be weakly excited, and the controller 41 may support the traveling of the electric vehicle 1 while measuring the electromotive force of the power receiver 31. The user may move the electric vehicle 1 in accordance with the traveling support. In this way, the power receiver 31 may be aligned with the power transmitter 103. The alignment may cause the power receiver 31 to generate an electromotive force larger than a predetermined value through an electromagnetic action of the weakly excited power transmitter 103. The controller 41 may thereby determine the completion of the alignment on the basis of the electromotive force.

In response to the completion of the alignment process J11 in the start period T1, the controller 41 may send a power transmission request to the power-transmission controller 105 via wireless communication by the communication units 33 and 106. If power transmission is available, the power-transmission controller 105 may send an affirmative response. The process then may proceed to a periodic process J12 in which power transmission is actually performed.

In the periodic process J12, the controller 41 may calculate an appropriate charging power from the status information of the battery 11, and notify the power-transmission controller 105 about the requested power. The power-transmission controller 105 may drive the inverter 102 so that the requested power is wirelessly transmitted from the power transmitter 103 to the power receiver 31. The transmitted power may be rectified at the rectifier 32 and fed to the battery 11 for charging of the battery 11. In the periodic process J12, the power-transmission controller 105 may activate the foreign-object detection processor 105a and execute a foreign-object detection process J13.

If neither a malfunction nor a foreign object is detected, the periodic process J12 may be repeated to continue the wireless charging of the battery 11.

In contrast, if a malfunction is detected by the power-transmission controller 105 (process J16) in a period T2 as illustrated FIG. 2, the power-transmission controller 105 may stop the power transmission from the power transmitter 103. As a result, the power transmitted from the power transmitter 103 may decrease or stop. The controller 41 of the electric vehicle 1 may detect this decrease or stopping of the transmitted power as an error in the power received by the power receiver 31 (process J31).

When the controller 41 detects an error in the received power (process J31), the record processor 41a of the controller 41 may wait for a predetermined time (process J32). If no notification is provided by the power-transmission controller 105 during this time, the record processor 41a may record error history information regarding the error in the error-history storage 41b (process J33). The error history information recorded here may include codes, such as a DTC, indicating errors in the power received during wireless charging, and log data, such as FFD, indicating the statuses of the components of the electric vehicle 1 during a predetermined duration of time starting from the time of error detection. The process of wireless charging may then end due to the error.

During maintenance of the electric vehicle 1, the service worker may retrieve the error history information using the retrieval function of the diagnostic tool and analyze the retrieved error history information. As a result of the analysis, the service worker may recognize that an abnormal stop of the wireless charging has occurred. Then, the service worker may perform malfunction diagnosis of the electric vehicle 1 or the ground equipment 100 on the basis of the error history information. The service worker then may specify the malfunction from the result of the malfunction diagnosis. This enables the service worker to remove the malfunction by part replacement or the like.

[Error History Recording of Wireless Charging: for Detection of Foreign Object]

Figure 3:
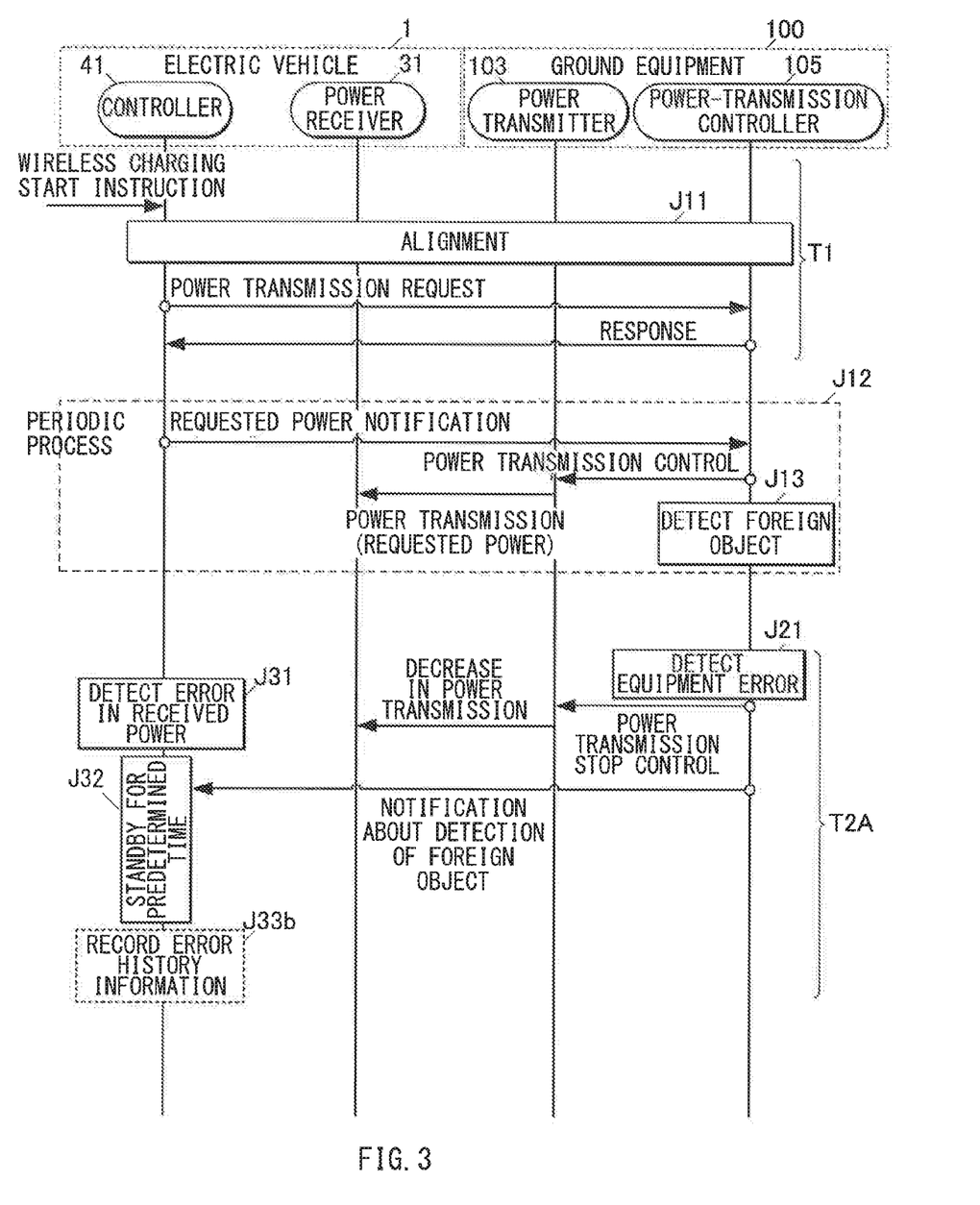
FIG. 3 is a sequence diagram illustrating the process flow according to one example embodiment for a case in which wireless charging is stopped due to detection of a foreign object.

FIG. 3 is a sequence diagram illustrating a process flow according to an embodiment for a case in which wireless charging is stopped due to the detection of a foreign object. After the process in the start period T1, the periodic process J12 may be repeated to continue the wireless charging of the battery 11. During this time, a foreign object can enter a site near the power transmitter 103.

In such a case, as in a period T2A, the power-transmission controller 105 may detect the presence of the foreign object (process J21) and stop the power transmission on the basis of the detected foreign object to reduce or stop the power transmission from the power transmitter 103 to the power receiver 31.

When the controller 41 of the vehicle 1 detects an error in the received power caused by a decrease in the power received by the power receiver 31 (process J31), the record processor 41a of the controller 41 may execute a standby process J32 for a predetermined time, as in the case illustrated in FIG. 2. If the power-transmission controller 105 provides a notification about detection of the foreign object within the predetermined time, the record processor 41a may prohibit the recording of the error history information from being executed (process J33b), unlike the case illustrated in FIG. 2. In this way, the error history information may not be recorded when wireless charging is stopped in response to the detection of a foreign object. Consequently, the data volume of the error history information regarding wireless charging recorded in the error-history storage 41b may be smaller than that recorded in a case of malfunction as illustrated in FIG. 2. Accordingly, the data volume of the error history information regarding wireless charging retrieved by the diagnosis tool using the retrieval function may be smaller in the process without recording illustrated FIG. 3 than in the processes illustrated in FIG. 2. For example, in the case of the processes illustrated in FIG. 3, the data volume may be zero. In one embodiment, the notification about detection of a foreign object may serve as a "notification about detection of a foreign object".

[Error History Recording of Wireless Charging: for Detection of Foreign Object]

Figure 4:
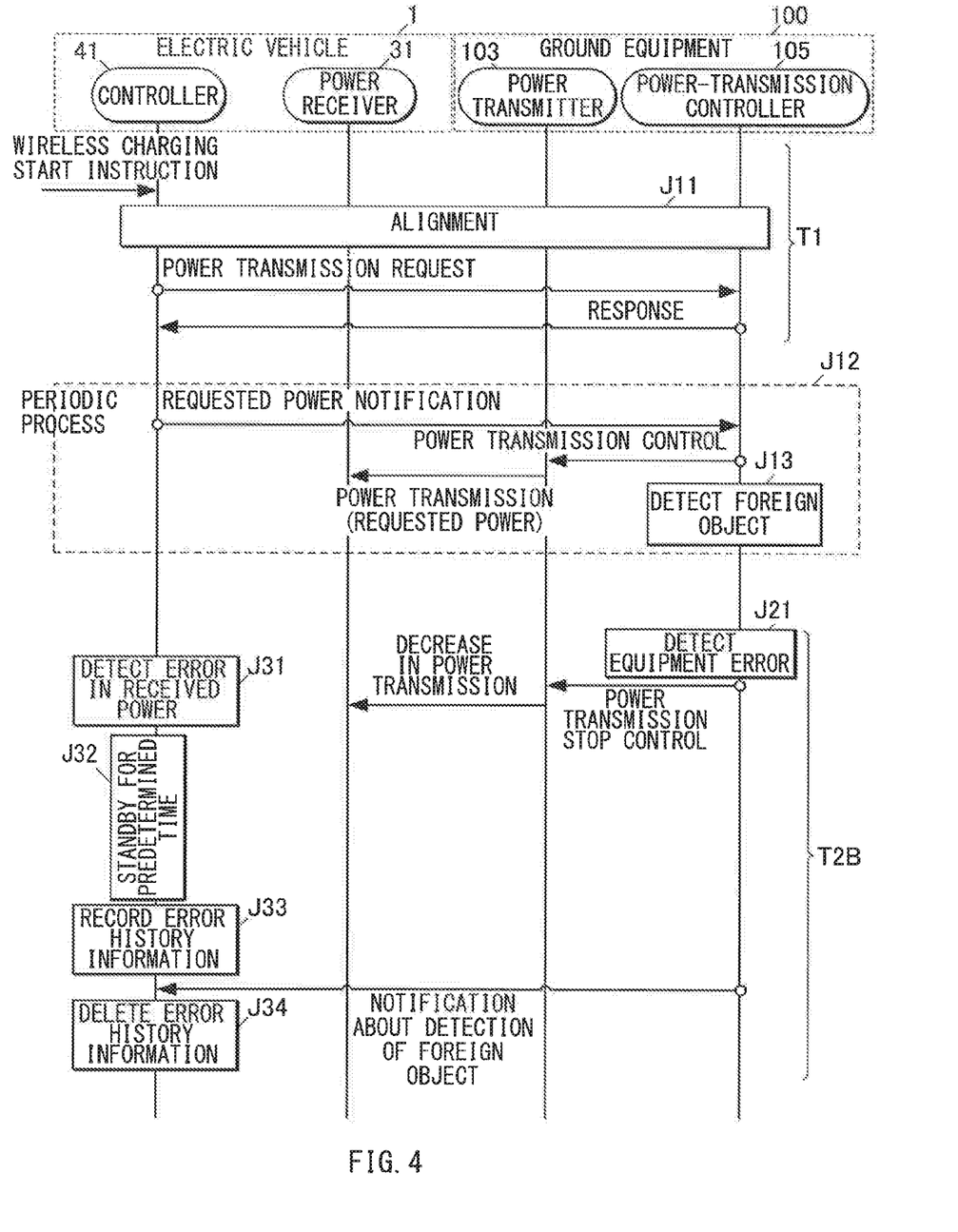
FIG. 4 is a sequence diagram illustrating a process flow according to one example embodiment for a case in which wireless charging is stopped due to detection of a foreign object.

FIG. 4 is a sequence diagram illustrating a process flow according to a second embodiment for a case in which wireless charging is stopped due to detection of a foreign object. Similar to the case illustrated in FIG. 3, when a foreign object enters a site near the power transmitter 103 while the wireless charging of the battery 11 proceeds as a result of the periodic process J12 being repeated, the power-transmission controller 105 may detect the presence of a foreign object (process J21) and stop power transmission in a period T2B. In response to this control for stopping power transmission, the power transmitted to the power receiver 31 may decrease or stop. The controller 41 of the electric vehicle 1 may then detect this as an error in the power reception (process J31).

In response to the detection of the error, the record processor 41a of the controller 41 may execute a standby process J32 for a predetermined time, as in the cases illustrated in FIGS. 2 and 3. If no notification about a foreign object is provided by the power-transmission controller 105 during this time, the record processor 41a may execute a recording process J33 of error history information. The error history information that is recorded here may include a code that indicates an error occurring in the received power during wireless charging and log data that indicates the statuses of the components of the electric vehicle 1 in a predetermined duration of time starting from the time of error detection. The record processor 41a may continue the reception process to wait for a notification about detection of a foreign object to be provided by the power-transmission controller 105 in the subsequent duration of a predetermined time. If a notification about detection of a foreign object is provided, the record processor 41a may execute a process J34 to delete the error history information recorded in the process J33.

In the deleting process J34, the record processor 41a may delete only the log data indicating the statuses of the component of the electric vehicle 1 while leaving the code indicating the content of the error undeleted. Alternatively, both the code and the log data may be deleted. In the deletion of the log data, the entire log data may be deleted or a portion of the log data may be deleted. The data volume of the error history information regarding wireless charging recorded in the error-history storage 41b in the deleting process J34 is smaller than that recorded in a case of malfunction, as illustrated in FIG. 2. Accordingly, the data volume of the error history information regarding wireless charging retrieved by the diagnosis tool using the retrieval function is smaller in the processes illustrated FIG. 4 than in the processes illustrated in FIG. 2.

When the wireless charging is stopped due to a malfunction in the power transmission to the power receiver 31, the error history information regarding errors in the wireless charging may be stored to facilitate malfunction diagnosis performed later. If the error history information is recorded also when wireless charging is stopped due to an error caused by a foreign object as in a case in which wireless charging is stopped due to a malfunction, the service worker can be required to search the recorded error history information for the malfunction during maintenance of the electric vehicle, even though no malfunction exists. This can impair the operating efficiency of the malfunction diagnosis. Further, the data volume of the error history information can be enormous as the length of the recording period increases, despite a limited volume of the storage for storing the error history information. Therefore, indiscriminate recording of the error history information can lead to a shortage in memory space in the storage. This embodiment provides a solution to such a concern and enables appropriate recording of error history information in a case of an error in wireless charging.

In this embodiment, the error history information regarding wireless charging to be recorded after the occurrence of an error in power transmission to the power receiver 31 may differ in data volume between a case in which a notification about detection of a foreign object is provided to the controller 41 and a case in which no notification is provided. That is, the data volume of the data to be recorded in the error-history storage 41b is smaller when a notification is provided than when no notification is provided. For example, in response to the notification about detection of a foreign object, recording of the error history information by the record processor 41a is not executed as described in the first embodiment illustrated in FIG. 3, or the error history information temporarily recorded in the record processor 41b is partially or entirely deleted as described in the second embodiment illustrated in FIG. 4. Therefore, when an error occurs in power transmission due to a malfunction, a large data volume of error history information beneficial to the diagnosis of the malfunction is recorded. In contrast, when an error occurs in power transmission due to a foreign object, a small data volume of error history information is recorded. In this way, it is possible to prevent a large data volume of error history information unnecessary for the diagnosis of malfunction from being left. This saves time and labor in diagnosing a malfunction on the basis of error history information irrelevant to the malfunction. It therefore is possible to appropriately record error history information relevant to errors in wireless charging.

Furthermore, in at least one of the embodiments, at least the log data that tends to be enormous in data volume may be deleted when the record processor 41a deletes the error history information. Therefore, by deleting unnecessary log data, it is possible to prevent a large storage space of the error-history storage 41b from being consumed by unnecessary information. It is also possible to prevent the recording of error history information from being disrupted in the case of another malfunction or the like.

In at least one of the example embodiments, when the notification about detection of a foreign object is provided from the power-transmission controller 105 to the controller 41, the record processor 41a may prohibit the recording of the error history information from being executed or partially or entirely delete the error history information temporarily recorded in the record processor 41a. These procedures may correspond to a process of causing the data volume of the error history information to be recorded to be different between some cases. That is, prohibition of the recording of the error history information or deletion of the error history information once recorded may be eventually or substantially regarded as a decrease in data volume.

[First Modification]

Figure 5:
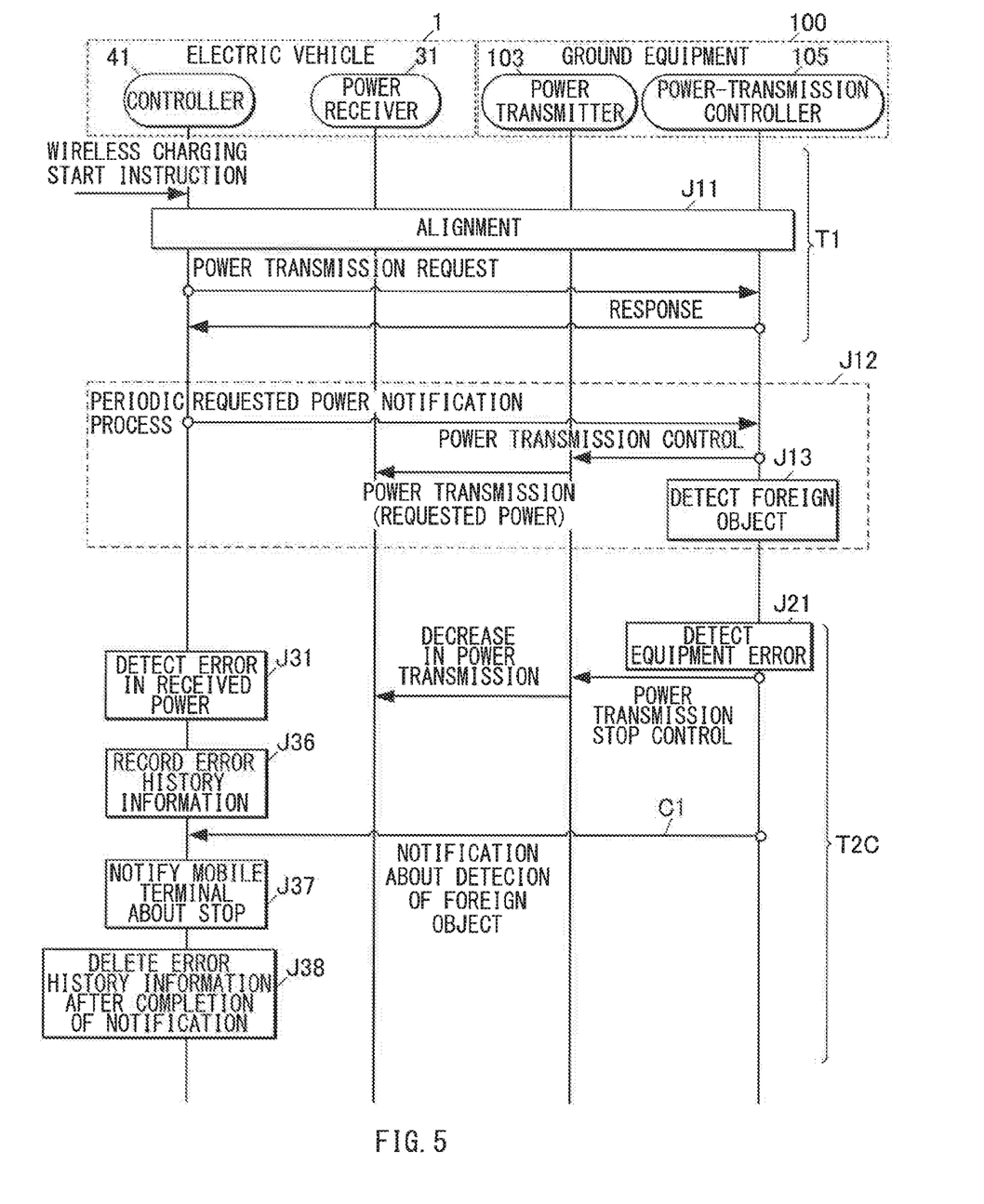
FIG. 5 is a sequence diagram illustrating a process flow according to one modification example for a case in which wireless charging is stopped due to detection of a foreign object.

FIG. 5 is a sequence diagram illustrating a process flow according to a first modification for a case in which wireless charging is stopped due to the detection of a foreign object. The electric vehicle 1 according to the first modification may differ from the electric vehicle 1 according to the first embodiment in the method of recording error history information on the basis of an error occurring during wireless charging. Other processes and components may be the same in any of the electric vehicles 1.

When a foreign object enters a site near the power transmitter 103 while the wireless charging of the battery 11 proceeds as a result of the periodic process J12 being repeated, the power-transmission controller 105 may detect the presence of the foreign object (process J21) and stop the power transmission in a period T2C. In response to this control for stopping power transmission, the power transmitted to the power receiver 31 may decrease or stop. The controller 41 of the electric vehicle 1 may then detect this as an error in the power reception (process J31). When an error is detected, the record processor 41a of the controller 41 may execute a recording process J36 of error history information. The error history information may include a code that indicates an error in the received power and log data that indicates the statuses of the components of the electric vehicle 1 in a predetermined duration of time starting from the time of error detection. The record processor 41a may wait for a notification about detection of a foreign object from the power-transmission controller 105 of the ground equipment 100 for a predetermined standby time. If the record processor 41a does not receive a notification about detection of a foreign object, the recording by the record processor 41a may end.

In contrast, if a notification C1 about detection of a foreign object is provided by the power-transmission controller 105 in response to the detection of a foreign object as in the period T2C illustrated in FIG. 5, the controller 41 may notify the user's mobile terminal via the telematics-service communication unit 39 about an abnormal stop or unexpected stop of wireless charging (process J37). After the notification has been completed in the process J37, the record processor 41a of the controller 41 deletes the error history information (process J38). The deletion of the information may involve deletion of only the log data or deletion of both the code and the log data. In the first modification, the record indicating that the wireless charging has undergone an abnormal stop may be left in the user's mobile terminal. It is, thus, possible to delete all codes and log data in the process J38.

If the notification to the mobile terminal is not completed before time runs out in the process J37 due to lost communication or the like, the record processor 41a may not delete the error history information in the process J38 or may delete a portion of the information smaller than that deleted when a notification about detection of a foreign object is completed. The record processor 41a then may end the process involving the recording of error history information.

In the first modification, as described above, if an error in wireless charging due to a foreign object is detected and the error history information is recorded, a notification may be provided to the user's mobile terminal. Then, when the notification to the mobile terminal is completed, the record processor 41a may delete the recorded error history information. Therefore, the notification to the mobile terminal enables the history of the error, i.e., a notification about the abnormal stop of wireless charging, to be recorded without using the storage space of the error-history storage 41b. Furthermore, when the history is recorded in the mobile terminal, the error history information regarding the error may be deleted from the error-history storage 41b. Therefore, it is possible to prevent excess consumption of the limited storage space of the error-history storage 41b by error history information unnecessary for diagnosis of the malfunction.

[Second Modification]

Figure 6:
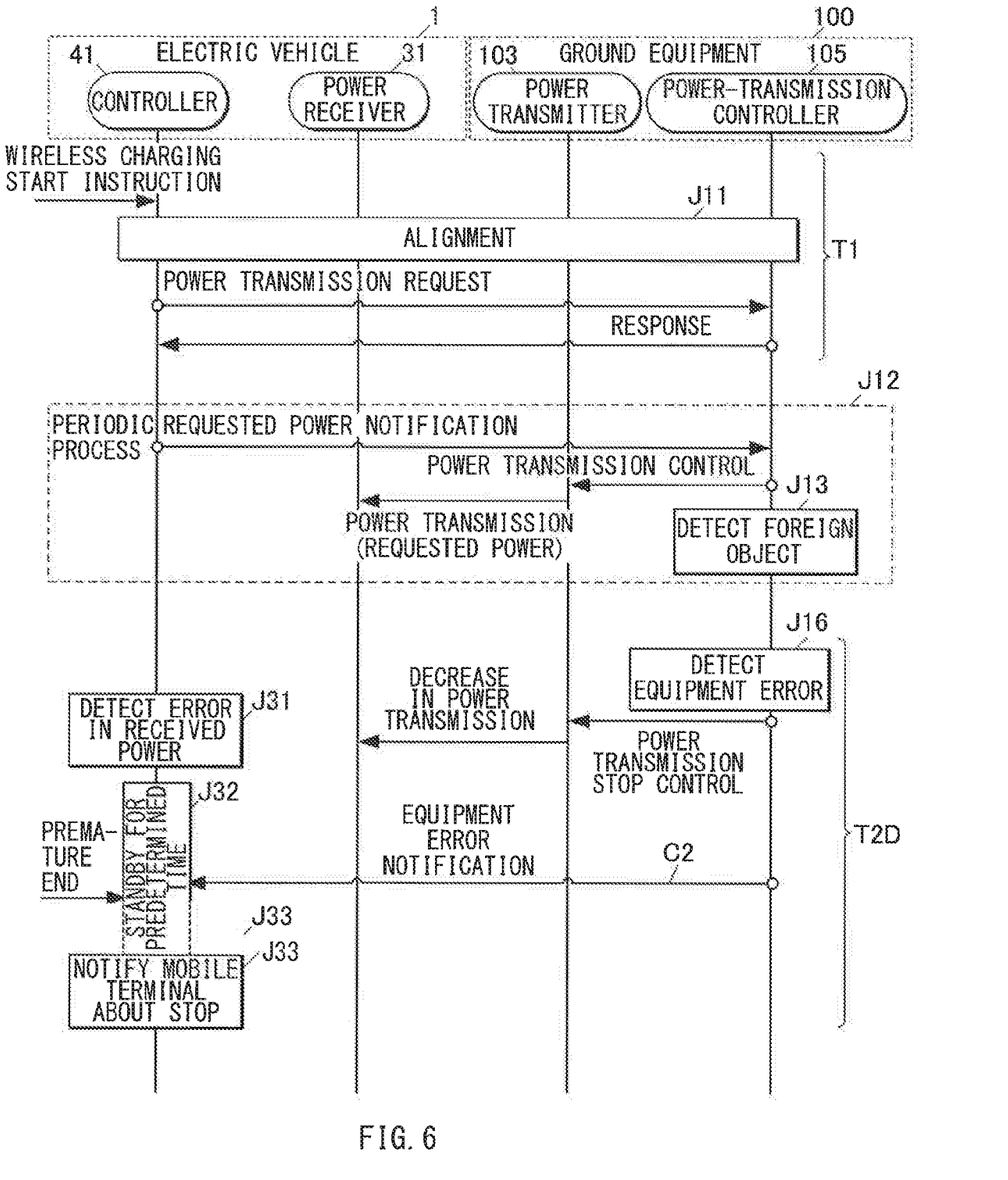
FIG. 6 is a sequence diagram illustrating a process flow according to one modification example for a case in which wireless charging is stopped due to detection of a foreign object.

FIG. 6 is a sequence diagram illustrating a process flow according to a second modification for a case in which wireless charging is stopped due to detection of a foreign object. The electric vehicle 1 according to the second modification may differ from the electric vehicle 1 according to the first embodiment or the first modification in part of the method of recording error history information based on error occurring during wireless charging. Other processes and components may be the same in any of the electric vehicles 1.

When the controller 41 of the electric vehicle 1 detects an error in the power reception (process J31) while wireless charging of the battery 11 proceeds as a result of the periodic process J12 being repeated, the record processor 41a may execute the standby process J32 for a predetermined time because there is a possibility that a notification about detection of the foreign object would be provided.

When the error is due to a malfunction or the like, and thus the notification about detection of the foreign object is not provided, the controller 41 may instruct the record processor 41a to record the error history information in the process J33 after the predetermined time has elapsed. For the process J33, refer to FIG. 2.

In the second modification, when the power transmission is stopped due to error other than detection of a foreign object, a notification C2 about the error may be sent from the power-transmission controller 105 of the ground equipment 100 to the controller 41 of the electric vehicle 1, as illustrated in FIG. 6. The notification C2 may be, for example, a notification about an equipment error. In response to the notification, the record processor 41a of the controller 41 may prematurely end the standby process even when it is midway of the standby process J32 of a predetermined time. The record processor 41a then may execute the process J33 to record the error history information including a code and log data before the predetermined time elapses and the standby process J32 ends.

In the second modification, when the notification C2 about an equipment error is provided during the standby process J32 for waiting for the notification about detection of a foreign object, the standby process J32 may be prematurely ended, and the error history information regarding the error may be recorded (process J33). Unless the code indicating the content of the error is determined after the error has been detected, the log data on which period after the detection of the error should be included in the error history information is not determined. This can require the recording of the log data indicating the statuses of the component of the electric vehicle 1 to continue until the code is determined. When the code indicating the content of the error is determined, the log data on the period corresponding to the code can be extracted and included in the error history information. Therefore, if the code is undetermined for a long period of time after the detection of the error, the data volume of the log data temporarily stored during this time can become enormous. In the second modification for addressing such a concern, when the notification C2 about an equipment error is provided, the standby process J32 may be prematurely ended, and the process J33 for recording the error history information regarding the equipment error may be executed. As a result, the data volume of the temporarily stored log data is prevented from significantly large. Since the limited storage space of the storage is also used for temporary storing the log data, a decrease in the data volume of the log data temporarily stored helps prevent the recording of the error history information from being disrupted due to a shortage of storage space.

Some embodiments of the disclosure have been described above. However, the disclosure is not limited to the embodiments described above. For example, in an above-described embodiment, the data volume of the error history information recorded by the record processor 41a when an error is detected in wireless charging and the notification about detection of a foreign object is provided is smaller than the data volume of the error history information recorded when no notification is provided. Alternatively, the data volume of the recorded data may be the same in both cases, or the relation of the data volume may be opposite to that described above, as long as the error history information regarding an error in wireless charging retrieved using a specific retrieval function has a smaller data volume when a notification about detection of a foreign object is provided than the data volume of the error history information retrieved when no notification is provided. For example, the code and the log data may both be recorded in any cases. However, upon the retrieval of the error history information, the log data may be omitted when the notification about detection of a foreign object is provided, whereas the log data is included when no notification about a foreign object is provided. In more detail, when error history information is retrieved using a retrieval function of a diagnostic tool, all error history information items recorded up to the point may be displayed in a list. It may be sufficient that any piece of data regarding wireless charging error selected from the list has a smaller data volume in a case where a notification about a foreign object is provided than in a case where no notification is not provided. Such a configuration allows a service worker to retrieve a large amount of the error history information indicating that the wireless charging has stopped due to a malfunction. Such a large amount of information may be help in finding the malfunction. In contrast, such a configuration allows the service worker to retrieve a small amount of the error history information indicating that the wireless charging has been stopped due to detection of a foreign object. Therefore, inefficient work is avoided, such as searching for a malfunction while considering various possibilities indicated by the error history information when no malfunction exists.

Furthermore, in a case where there are multiple retrieval functions for retrieving the error history information and where the error history information regarding wireless charging is retrieved using all retrieval functions, the data volume of the error history information retrieved using all retrieval functions may not satisfy the above-described condition. That is, it may be sufficient that the data volume of the error history information retrieved using a specific retrieval function among a plurality of retrieval functions satisfies the above-described condition. As an example, it may be presumed that the diagnostic tool includes a retrieval function in a normal mode to be used by a service worker and a retrieval function in a developer mode to be used by a developer of the manufacturer. In this presumption, for example, when the error history information retrieved using the retrieval function in the developer mode includes error history information regarding wireless charging, all recorded information items may be retrieved in a case where a notification about detection of a foreign object is provided and a case where no notification is provided. In such a case, the data volume of the information retrieved may be the same for both cases, or the data volume of the information retrieved in the latter case may be larger. In contrast, when the error history information retrieved using the retrieval function in the normal mode includes error history information regarding wireless charging, the data volume of the information retrieved in the former case may be smaller.

The error history information may be retrieved using a specific retrieval function. For example, the error history information regarding an error wireless charging may be retrieved using a retrieval function in, for example, a normal mode. To cause the data volume of information retrieved when a notification about detection of a foreign object is provided to be smaller than the data volume of information retrieved when no notification is provided, the record processor 41a may later set some or all of the recorded error history information not to be retrieved by a specific retrieval function. Such a setting may be realized through various procedures. For example, the record processor 41a may change the attribute data of the error history information so that the retrieval is not allowed in the normal mode or the retrieval is allowed only in the developer mode. Alternatively, the record processor 41a may move the error history information to a region not accessible in the normal mode or a region accessible only by a developer.

In one configuration, when an error occurs, for example, header information may be prepared in a data format for recording the error history information, and then the main data of the error history information may be recorded subsequent to the header information. In another configuration, when an error occurs, for example, management data for managing the individual error history information items may be prepared, and the main data of the error history information may be recorded in correlation with the management data. In such a case, if the recorded error history information is partially omitted or completely deleted in response to the notification about detection of a foreign object, only the header information or the management data without the main data of the error history information can remain in some cases. If the retrieval function of the diagnostic tool does not support such a data pattern, a retrieval error can occur upon the retrieval of the error history information. However, even in such a case, the record processor 41a may add attribute information indicating that the retrieval is not allowed in the normal mode to the region of the error history information that has been partially omitted or completely deleted (or the header information or the management data of the error history information), or move the error history information to another region not accessible in the normal mode. In this way, it is possible to avoid a retrieval error described above.

In the embodiments described above, in the case of an error in the power transmission to the power receiver 31, the data volume of the error history information to be recorded is smaller when a notification about detection of a foreign object is provided than when no notification is provided. In other words, the volume of the data retrieved by a retrieval function of a diagnostic tool is smaller when the notification about a foreign object is provided. Therefore, in the case of an error in the power transmission caused by a malfunction, a large data volume of error history information beneficial to the diagnosis of the malfunction is recorded and retrieved. In contrast, in the case of an error in the power transmission caused by a foreign object, information unnecessary for the diagnosis of the malfunction is prevented from being recorded and retrieved in large data volumes. In this way, the embodiments may enable appropriate recording of the error history information regarding an error in wireless charging.

Embodiments of the technology have been described in detail with reference to the accompanying drawings. Note that the technical scope of the disclosure is not limited to the embodiments. It is obvious that a person having ordinary skill in the art would be able to conceive various variations or modifications besides the specific examples of the technology within the scope of the technical idea recited in the claims, which are also understood to fall within the technical scope of the disclosure.

One or more of the controller 41, the record processor 41a, and the error-history storage 41b illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 41, the record processor 41a, and the error-history storage 41b. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the controller 41, the record processor 41a, and the error-history storage 41b illustrated in FIG. 1.

The invention claimed is:

1. An electric vehicle comprising:
a power receiver configured to wirelessly receive electric power from power transmission equipment disposed outside the vehicle;
a controller configured to control the reception of the electric power via the power receiver;
an error detector configured to detect an error in power transmission from the power transmission equipment to the power receiver during the control of the reception of the electric power by the controller; and
a record processor configured to
record error history information regarding the error detected by the error detector, and
cause a data volume of the error history information retrievable from the record processor when the error is due to a foreign object present between the power transmission equipment and the vehicle to be different from a data volume of the error history information retrievable from the record processor when the error is not due to the foreign object, the data volume of the error history information retrievable from the record processor when the error is due to the foreign object being smaller than the data volume of the error history information retrievable from the record processor when the error is not due to the foreign object.

2. The electric vehicle according to claim 1, further comprising:
an electric motor for traveling; and
a battery configured to store electric power to be fed to the electric motor, wherein
the power receiver charges the battery with the electric power received from the power transmission equipment, and
the controller controls the charging of the battery.

3. The electric vehicle according to claim 1, further comprising
a communication unit configured to communicate with the power transmission equipment, wherein
the controller controls the reception of the electric power on a basis of information acquired via the communication unit.

4. The electric vehicle according to claim 3, configured to receive a notification about detection of the foreign object from the power transmission equipment, wherein
the data volume of the error history information retrievable from the record processor is smaller when the notification is received by the vehicle than when the notification is not received by the vehicle.

5. The electric vehicle according to claim 4, wherein, when an error is detected in the power transmission to the power receiver, the record processor prohibits recording of a portion or all of the error history information on a basis of the notification about detection of the foreign object.

6. The electric vehicle according to claim 4, wherein, when an error is detected in the power transmission to the power receiver, the record processor records the error history information and then deletes a portion or all of the error history information on a basis of the notification about detection of the foreign object.

7. The electric vehicle according to claim 4, wherein, when an error is detected in the power transmission to the power receiver, the record processor records the error history information and then prohibits retrieval of a portion or all of the error history information from the record processor on the basis of the notification about detection of the foreign object after recording the error history information.

8. The electric vehicle according to claim 6, further comprising
an information output unit configured to output information to a mobile terminal, wherein the record processor deletes the recorded error history information after a notification about the error in the power transmission to the power receiver is sent from the information output unit to the mobile terminal.

9. The electric vehicle according to claim 4, wherein, when the record processor does not receive the notification about detection of the foreign object for a predetermined time after an error has occurred in the power transmission to the power receiver, the record processor records the error history information, whereas, when the record processor receives a notification about an error other than the error due to the foreign object within the predetermined time, the record processor records the error history information before the predetermined time elapses.

10. The electric vehicle according to claim 5, wherein, when the record processor does not receive the notification about detection of the foreign object for a predetermined time after an error has occurred in the power transmission to the power receiver, the record processor records the error history information, whereas, when the record processor receives a notification about an error other than the error due to the foreign object within the predetermined time, the record processor records the error history information before the predetermined time elapses.

11. The electric vehicle according to claim 6, wherein, when the record processor does not receive the notification about detection of the foreign object for a predetermined time after an error has occurred in the power transmission to the power receiver, the record processor records the error history information, whereas, when the record processor receives a notification about an error other than the error due to the foreign object within the predetermined time, the record processor records the error history information before the predetermined time elapses.

12. The electric vehicle according to claim 7, wherein, when the record processor does not receive the notification about detection of the foreign object for a predetermined time after an error has occurred in the power transmission to the power receiver, the record processor records the error history information, whereas, when the record processor receives a notification about an error other than the error due to the foreign object within the predetermined time, the record processor records the error history information before the predetermined time elapses.

13. The electric vehicle according to claim 8, wherein, when the record processor does not receive the notification about detection of the foreign object for a predetermined time after an error has occurred in the power transmission to the power receiver, the record processor records the error history information, whereas, when the record processor receives a notification about an error other than the error due to the foreign object within the predetermined time, the record processor records the error history information before the predetermined time elapses.

14. The electric vehicle according to claim 1, wherein the error history information includes a code indicating a content of the detected error and log data indicating a status of the vehicle when the error is detected, and the record processor reduces at least a data volume of the log data retrievable from the record processor.

15. The electric vehicle according to claim 2, wherein the error history information includes a code indicating a content of the detected error and log data indicating a status of the vehicle when the error is detected, and the record processor reduces at least a data volume of the log data retrievable from the record processor.

16. The electric vehicle according to claim 3, wherein the error history information includes a code indicating a content of the detected error and log data indicating a status of the vehicle when the error is detected, and the record processor reduces at least a data volume of the log data retrievable from the record processor.

17. The electric vehicle according to claim 4, wherein the error history information includes a code indicating a content of the detected error and log data indicating a status of the vehicle when the error is detected, and the record processor reduces at least a data volume of the log data retrievable from the record processor.

18. The electric vehicle according to claim 5, wherein the error history information includes a code indicating a content of the detected error and log data indicating a status of the vehicle when the error is detected, and the record processor reduces at least a data volume of the log data retrievable from the record processor.

19. A charge control apparatus for an electric vehicle, the apparatus comprising:
a power receiver configured to wirelessly receive electric power from power transmission equipment disposed outside the vehicle and charge a battery with the received electric power; and
circuitry configured to
control the charging of the battery via the power receiver,
detect an error in power transmission from the power transmission equipment to the power receiver during the charging of the battery,
record error history information regarding the detected error, and
cause a data volume of the error history information retrievable when the error is due to a foreign object present between the power transmission equipment and the vehicle to be different from a data volume of the error history information retrievable from the record processor when the error is not due to the foreign object, the data volume of the error history information retrievable when the error is due to the foreign object being smaller than the data volume of the error history information retrievable when the error is not due to the foreign object.

* * * * *